INVENTORS.
ALVIN J. SILVERMAN
ALBERT DIAMOND
BY
ATTORNEY

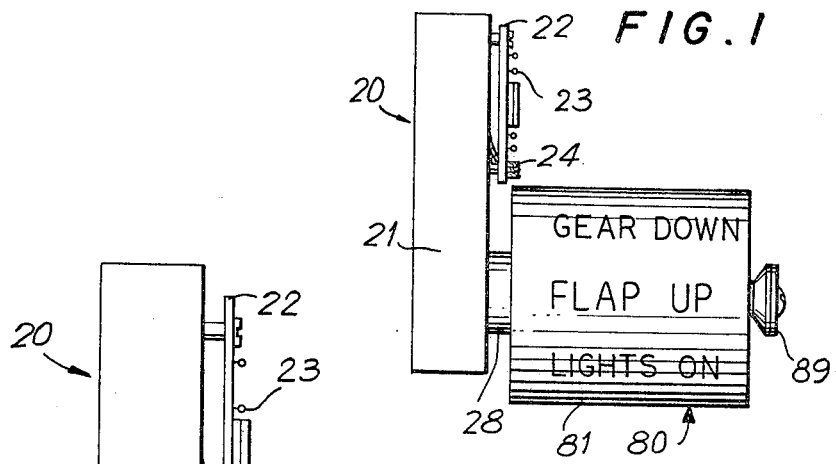
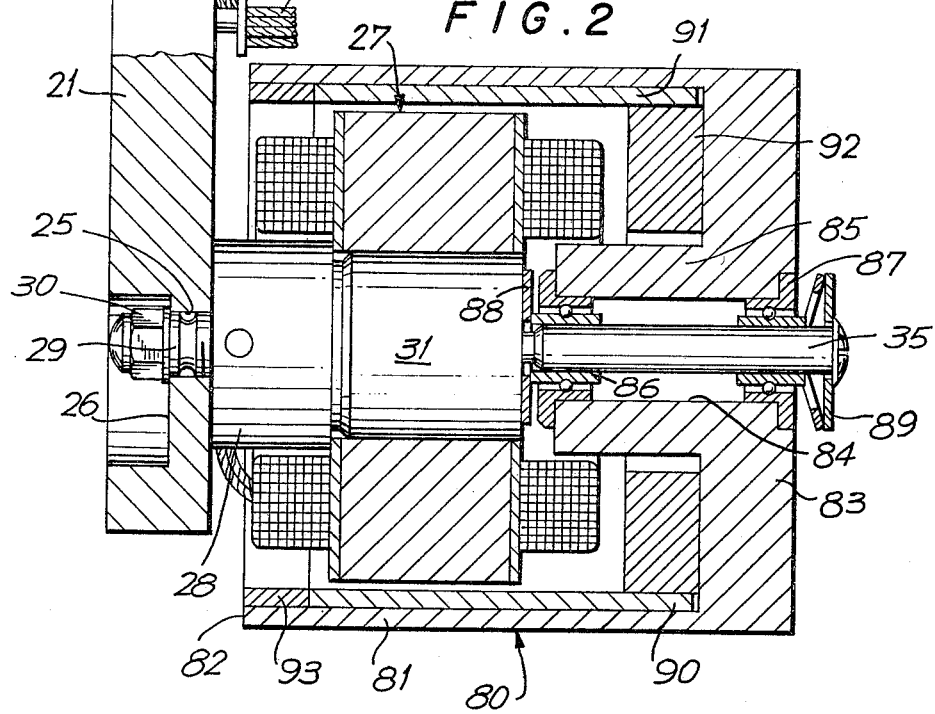

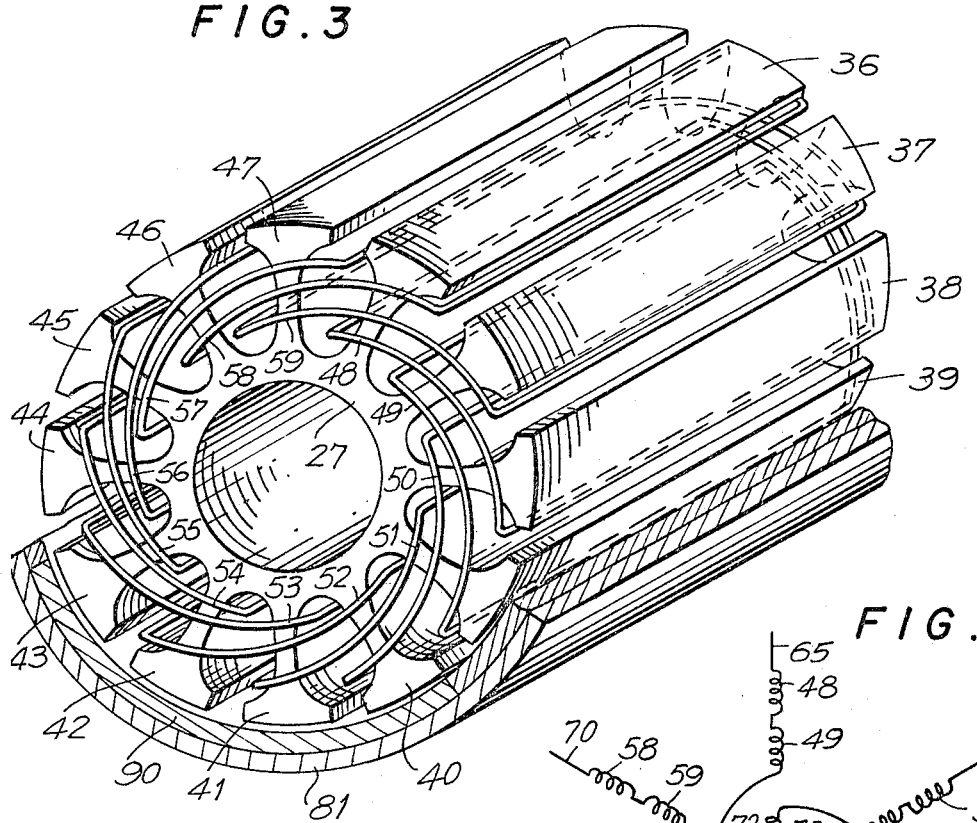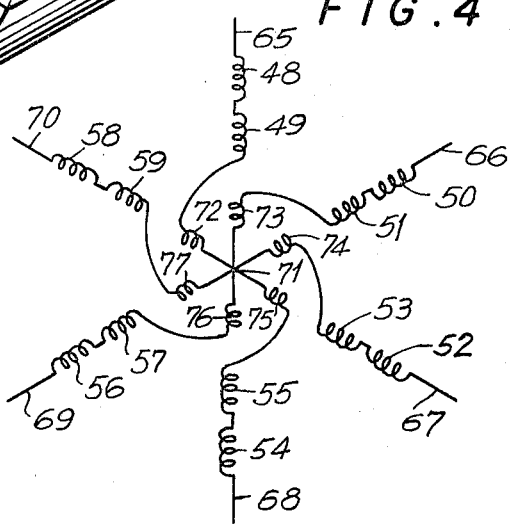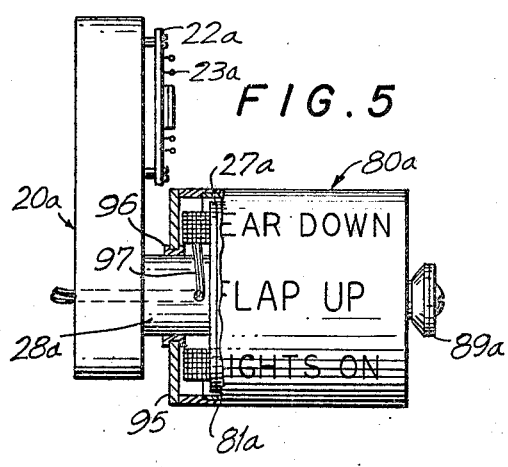

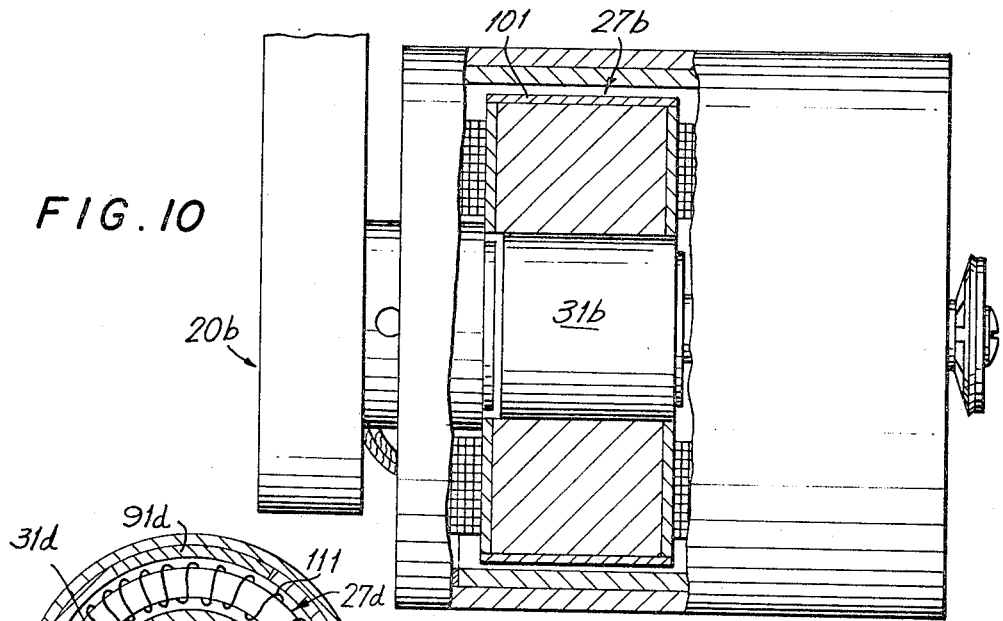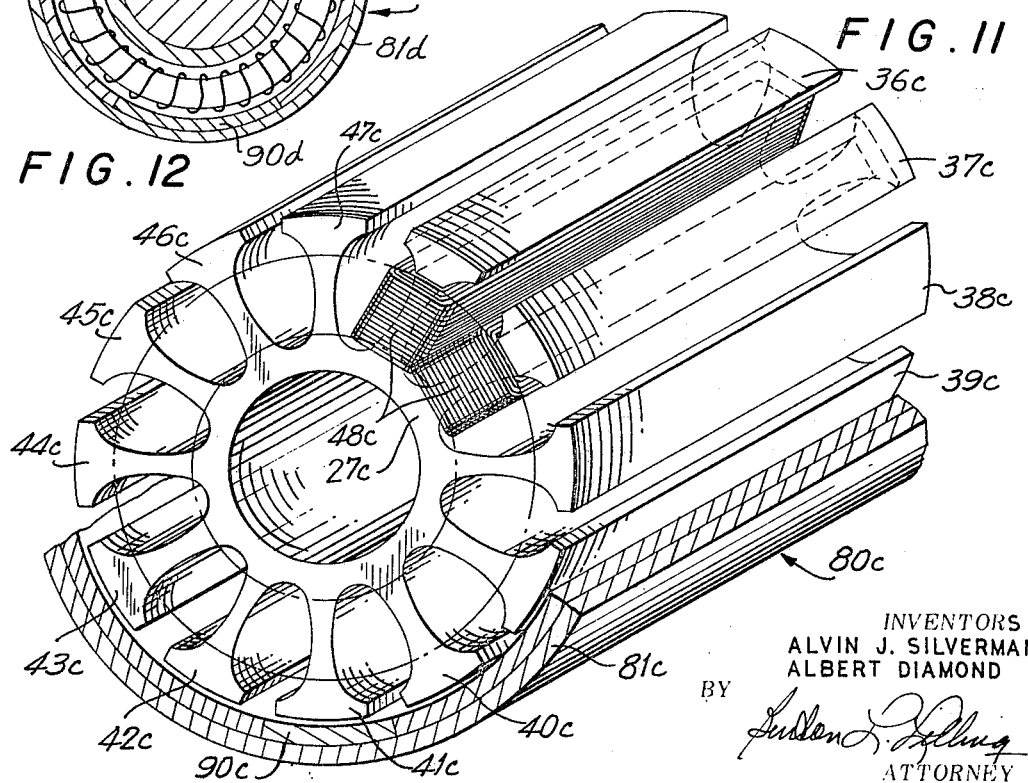

United States Patent Office 3,479,626
Patented Nov. 18, 1969

3,479,626
ELECTROMECHANICAL READ-OUT DEVICE
Alvin J. Silverman, Massapequa, and Albert Diamond, Plainview, N.Y., assignors to Vernitron Corporation, Farmingdale, N.Y., a corporation of New York
Filed Dec. 12, 1967, Ser. No. 689,961
Int. Cl. H01f 7/08, 5/04
U.S. Cl. 335—266             10 Claims

ABSTRACT OF THE DISCLOSURE

This invention is essentially concerned with read-out devices of the type including a central stator surrounded by a rotary drum carrying information at angularly spaced positions, on its exterior surface, and interacting electromagnetic means on the stator and drum for selectively positioning the latter.

BACKGROUND OF THE INVENTION

While there have, in the past, been proposed electromagnetic drum-type read-out devices, such devices have been subject to certain limitations and difficulties. For example, prior read out devices generally consisted of a circular array of salient poles with a permanent magnet core centered therein. The magnetic circuits of such devices were of relatively low efficiency thus developing lower torque to watt ratio, so that the prior devices have been satisfactory for only smaller and lighter, relatively narrow drums having limited indicating ability. Larger drums in prior devices were not utilized because, in addition to requiring excessive power, the drum would have oscillated excessively about its desired set position. That is, because such larger drums posses more inertia, and the units developed low torque, the damping factor would be low and the amplitude or frequency of oscillation before positioning would be high. Most prior art units do not develop the torque required to drive such larger drums in any event.

By the teachings of the prior art, under ordinary circumstances, when utilizing salient poles and when obtaining a number of indicating positions in excess of the number of coils or phases, the results were not entirely satisfactory. That is, where a plurality of coils were actuated thus to obtain an indicating position intermediate a pair of home positions in magnetic alignment with adjacent coils, a condition of unstable equilibrium resulted when power was removed, and the device offset randomly not necessarily in alignment with the indicated position. Likewise, when power is applied, orientation would not be precise.

SUMMARY

Accordingly, it is an important object of the present invention to provide a read-out device of the type described preferentially of the two-pole type and which overcomes the above-mentioned difficulties, and wherein relatively high torque is achieved with substantial reduction in necessary excitation power for satisfactory use with larger and higher intertia drums. That is, a unit that develops a higher torque to inertia ratio.

It is another object of the present invention to provide a unique selectively excitable magnetic circuitry wherein may be achieved a number of indicating positions in excess of the number of excitable phases, each of such indicating positions being highly stable and precise for satisfactory detenting under severe conditions of vibration and shock.

It is also an object of this invention to provide a read-out device having an indicator drum capable of being inscribed with relativley lengthy messages or legends.

It is still a further object of the present invention to provide a read-out device having the advantageous characteristics mentioned in the preceding paragraphs, which is extremely simple in construction, durable and reliable throughout a long useful life, and which can be economically manufactured, installed and maintained.

The read-out device of the instant invention also contemplates the provision of means for quickly and accurately achieving 180-degree rotor rotation upon excitation of a pole diametrically opposite the detent position.

Other objects of the present invention will become apparent upon reading the following specification and referring to the accompanying drawing, which form a material part of this disclosure.

The invention accordingly consists of the features of construction, combinations of elements, and arrangements of parts, which will be exemplified in the construction hereinafter described, and of which the scope will be indicated by the appended claims.

BRIEF DESCRIPTION OF THE DRAWING

FIGURE 1 is a front elevational view showing a read-out device constructed in accordance with the teachings of the present invention;

FIGURE 2 is an elevational view similar to FIGURE 1, but partly in section and enlarged for clarity;

FIGURE 3 is a perspective view showing the stator stack of the instant read-out device apart therefrom, with a representation of the windings thereon, and partially illustrating the rotor in position relative to the stator;

FIGURE 4 is a schematic representation of an electrical circuit which may be used with the stator of FIGURE 3 and showing one of the means for effecting 180 degree rotor rotation.

FIGURE 5 is a front elevational view showing a slightly modified embodiment of the instant read-out device, partly broken away;

FIGURE 10 is an elevational view, partly in section, similar to FIGURE 2, but illustrating another embodiment of this invention;

FIGURE 11 is a perspective view similar to FIGURE 3, showing another embodiment of a stator stack of the instant readout device, apart therefrom, with a representation of the windings thereon, and partially illustrating the rotor in position relative to the stator; and FIGURE 12 is a sectional view showing a slightly modified embodiment showing a stator of toroidal windings that may be used in the instant invention.

DESCRIPTION OF THE PREFERRED EMBODIMENTS

Figure 6:
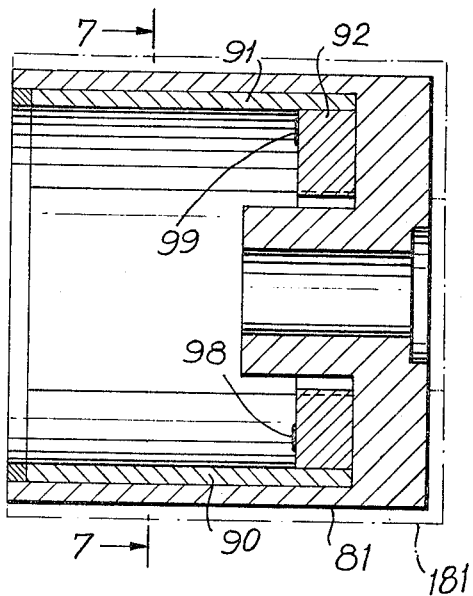
FIGURE 6 is a sectional elevational view showing a rotor of the present invention apart from the remainder of the read-out device.

Referring now to FIGURES 1 and 2, a read-out device is there generally designated 20 and may include a mounting plate 21 for affixation to a suitable support. Associated with the readout device 20 may be any desired circuitry, such as a printed circuit board 22, associated components 23 and leads 24.

In a lower region of the mounting plate 21 there is provided a thru hole 25 opening into a recess 26 on the back side of the plate. A stator assembly generally designated 27 is disposed on the front side of the mounting plate 21 in alignment with the thru hole 25. The stator assembly may include a generally cylindrical fixed core 31, a spacer or mounting member 28 fixed to the inner end of the core 31, and a stud 29 extending through the hole 25 into recess 26. Suitable fastening means, such as a nut 30, may be engaged on the stud 29 to retain the stator assembly 27 fixed in the illustrated position.

Extending axially from the stator core 31, away from the mounting plate 21, is a journal shaft 35, for a purpose appearing presently.

As best seen in FIGURE 3, the stator assembly 27 is provided on the outer surface of core 31 with a plurality of angularly spaced, radially outstanding teeth 36–47. That is, the teeth 36–47 are disposed in an angular array circumferentially about the core 31, and may be longitudinally coextensive with the core, having a generally T-shaped cross-sectional configuration. In practice, the stator assembly 27 and its teeth 36–47 may be formed of a plurality of laminations of magnetically soft material, cemented or otherwise secured to an integral stepped shaft unit comprising stud 29, member 28, core 31 and journal shaft 35.

Electrical conductors or wires are wound about the teeth 36–47 to form a plurality of coils 48–59. As appears diagrammatically in FIGURE 3, each coil 48–59 extends about a plurality of teeth, the preferred embodiment illustrating each coil as extending about three teeth, but each coil may extend about one or more teeth, as hereinafter 48–59 extend about one or more of the same or common teeth, the illustrated embodiment showing each adjacent pair of coils extending about a pair of common teeth. For example, the adjacent pair of coils 48 and 49 extend about the common teeth 37 and 38. It is also preferred that each successive adjacent or overlapping pair of the coils 48–59 be connected in series to define a single electrical phase. Thus, there may be less phases than coils, the illustrated embodiment showing one-half as many phases as coils. In the schematic illustration of FIGURE 4, the adjacent overlapping coils 48 and 49 may be connected in series to define a single phase 65. Similarly, the adjacent overlapping pair of coils 50 and 51 may define a single phase 66, the adjacent overlapping coils 52 and 53 defining a single phase 67, coils 54 and 55 defining phase 68, coils 56 and 57 defining phase 69, and coils 58 and 59 defining phase 70. The several phases 65–70 may be connected to a common or ground 71, for simplicity of wiring.

The angular distance or arc encompassed by each phase may be considered as the pole arc or pole pitch. In the illustrated embodiment of FIGURE 3, the pole arc or pitch is equal to the angle subtended by four teeth. For example, the pole arc of phase 65 is the angle subtended by teeth 36–39. It will now be appreciated that the magnetic field of the pole arc of phase 65 is centered between teeth 37 and 38; and further, by the overlapping of coils 48 and 49 about common teeth 37 and 38, the magnetic field of phase 65 has its central or medial region magnetically enhanced or heightened to define a salient pole midway between the teeth 37 and 38.

In addition to individual excitation or energization of a selected phase 65–70, a pair of adjacent phases may be simultaneously excited. Say upon simultaneous excitation of adjacent phases 65 and 66, in addition to the overlapping of the coils of the respective phases, there is also overlapping of the coils of the separate phases so that three coils of the phases 65 and 66 extend about or are common to teeth 38 and 39. This serves to enhance or densify the flux pattern created and locate a salient pole with its center between teeth 38 and 39. By continuing the above reasoning, it will be apparent that a number of salient poles may be created by excitation of phases either separately or in pairs equal to the number of teeth 36–47 and double the number of phases. Also, the field pattern of the magnetomotive force of the salient poles thus created is such as to more positively locate the salient-pole center or medial position.

In addition, each phase 65–70 may include, say connected in series therewith, a magnetic formation defined by a tertiary or auxiliary coil, as at 72–77. The auxiliary coils 72–77 are located, as by being wound about certain teeth, angularly offset from the magnetic center of the respective phase. By this construction, upon excitation of a phase or phases diametrically opposite, a slightly off-center magnetic force is created to insure 180 degree rotation, as will appear more fully hereinafter.

Circumposed about the stator 27, its teeth 36–47 and windings 48–59, is a drumlike rotor, generally designated 80. In the embodiment of FIGURES 1–3, the rotor 80 may include a cylinder or drum 81 coaxially circumposed about the stator 27 having one end open, as at 82, adjacent to the mounting plate 21. The outer or front end of the drum 81 may be closed by an end wall 83, which may be formed with a central or thru bore 84 spacedly receiving the shaft 35. Interiorly of the end wall 83, surrounding the bore 84 and defining an inward extension thereof, there may be provided a tubular extension or nipple 85 extending toward and terminating short of the core 31. Suitable journal means, such as ball-bearing assemblies 86 and 87, may be circumposed about the shaft 35 within the bore 84 to rotatably mount the drum 81 on the shaft. A spacer or shim 88 may be interposed between the inner race of bearing assembly 86 and core 31 for properly spacing the same, and suitable retainer means 89 may be provided on the outer end of shaft 35 to retain the rotor on the shaft.

Interiorly of the drum 81, say at diametrically opposed locations therein, may be fixed, by any suitable means, a pair of magnetic members or pole shoes 90 and 91, each having an arcuate configuration conforming to that of the stator and its teeth. The magnetic members 90 and 91 may extend longitudinally along the teeth 36–39 and forwardly beyond the teeth substantially to the drum end wall 83. As appears in FIGURE 3 each magnetic member 90 and 91 may be of an arcuate distance approximating the pole arc or pitch of the stator, being approximately four teeth in the illustrated embodiment. The magnetic members 90 and 91 are advantageously of a magnetically soft material, but may be otherwise, as will appear hereinafter. Interposed within the drum 81, closely adjacent to the drum end wall 83, may be a permanent magnet 92 extending diametrically between opposed magnetic members 90 and 91, and having a central opening receiving the internal extension 85. Thus, the permanent magnet 92 combines with the magnetic members 90 and 91 and the stator teeth and coils to define closed magnetic circuits. The magnetic members 90 and 91 may be retained in position within the drum 81 by any suitable means, such as a retaining ring 93 adjacent to the open drum end 82. This arrangement provides large pole shoes on the rotor thus to maximize the effect of the permanent magnet.

In operation, it will now be understood that a magnetic pattern created by excitation of one or more phases 65–70 of the coils 48–59 applies a magnetic force to the members 90 and 91 and permanent magnet 92 effecting rotation of the drum 81 to a position of minimum magnetic reluctance. That is, one of the magnetic members 90 and 91 tends to align with a magnetic field of a salient pole created as described hereinbefore. Upon removal of excitation from the coils, the permanent magnetism of magnet 92, and the configuration of the magnetic circuit effects retention of the drum in its set position. This is commonly known as detenting, and by the apparatus of this invention it is relatively positive and precise by virtue of the magnetic circuitry described hereinbefore. Also, the high efficiency of the magnetic circuit of this invention, resulting from the structure and coil arrangement, produces a relatively high torque applied to the magnetic components of the drum to insure a quick, positive and precise movement of the drum or rotor without appreciable oscillation or dither.

It will also now be appreciated that upon excitation of an opposite pole the angularly offset auxiliary coil 72-77 of the excited phase will initiate and insure the desired 180-degree rotor rotation. For example, when phase 68 is activated, its auxiliary winding 75 will also be activated. The ratio of the primary windings 54 and 55 of phase 68 to the auxiliary winding 75 is great so that the vector sum of the two magnetic fields provide a small angular offset—small enough to prevent ambiguity and not to prevent detenting in the proper position when power is removed—but large enough to pull off center when a diametrically opposite phase is actuated. In practice, the angle of offset is approximately but not limited to 2 or 3 degrees.

In the embodiment of FIGURE 5 there is shown a slightly modified read-out device, generally designated 20a, wherein a rotor 80a includes a generally cylindrical hollow drum 81a and is provided on its inner end with an annular end closure 95 circumposed about the tubular spacer 28a in sealed relation therewith, as by an annular seal 96. In this embodiment, both ends of the drum or rotor 80a may be closed, and necessary leads or conductors 97 may pass to the stator 27a through the tubular spacer 28a. In addition two permanent magnets 92 may be employed, one at either end of the rotor.

Figure 7:
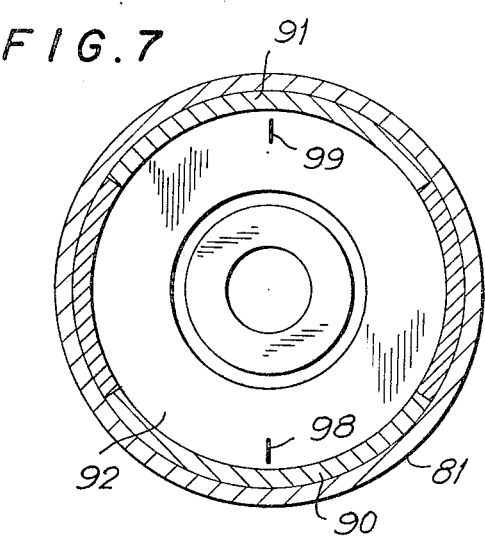
FIGURE 7 is a transverse sectional view taken generally along the line 7—7 of FIGURE 6.

In association with the circuitry of FIGURE 4, wherein are employed angularly offset auxiliary coils 72-77, the permanent magnet 92 may have its direction of magnetism extending diametrically between the diametrically opposed magnetic members 90 and 91. This is indicated by the markings 98 and 99 in FIGURE 7. Thus, the auxiliary coils 72-77 define angularly offset magnetic-circuit formations for initiating 180-degree rotor rotation upon energization of a diametrically opposite pole.

Figure 8:
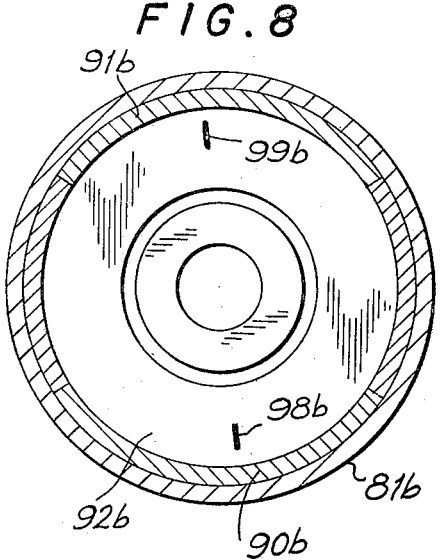
FIGURE 8 is a transverse sectional view similar to FIGURE 7, but illustrating a slightly modified embodiment.

An alternative embodiment is illustrated in FIGURE 8, wherein a permanent magnet 92b is magnetized along a diameter slightly angularly offset with respect to the diametrically opposed magnetic members 90b and 91b. This is indicated by the markings 98b and 99b. This structure also provides an angularly offset magnetic-circuit formation for initiating 180-degree rotor rotation upon energization of an opposite phase or phases.

Figure 9:
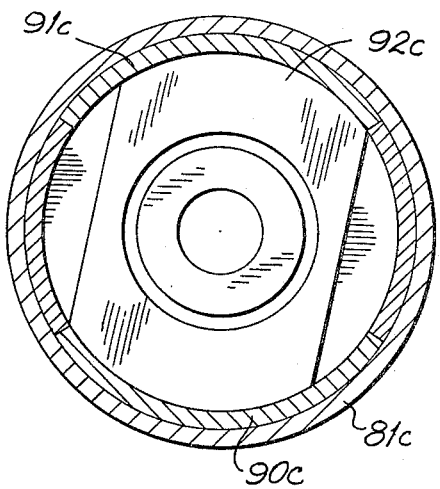
FIGURE 9 is a transverse sectional view similar to FIGURES 7 and 8, but showing a further modification of the instant invention.

Another mode of offset magnetic formation is shown in FIGURE 9, wherein a magnet 92c is, itself angularly offset with respect to the diametrically opposed magnetic members 90c and 91c. Similar effect may be achieved by any appropriate asymmetry of the permanent magnet or by otherwise creating an asymmetric field of flux. For example magnetic formations may be provided in the rotor assembly such as is shown in our co-pending application 660,399, filed Aug. 14, 1967.

While the rotor 80 has been illustrated as employing a permanent magnet 92 and a pair of diametrically opposed, magnetic members or shoes 90 and 91 of magnetically soft material, it is, of course, appreciated that the members 90 and 91 may be permanent magnets if desired, and a soft iron member used in place of the permanent magnet 92. That is, the rotor structure is not limited to any specific position of the permanent magnet and the effect of the permanent magnet may be maximally utilized by cooperative asociation with contiguously situated soft iron members. Permanent magnets may be at one or both ends of the rotor and the shoes may be magnetically soft, and, conversely the shoes may be hard (permanent magnets) and the magnets replaced by soft material, so long as there is at least one permanent magnet.

It is also to be appreciated that the number of coils or phases and/or the saliency of the stator poles is immaterial to the operability of the apparatus of this invention. The high torque to inertia ratio obtains herein by reason of the unique rotor construction, which, for some purposes, may be described as an "inside out" construction. More specifically, the high torque to inertia ratio and the resultant greater rate of acceleration obtain by reason of providing a rotor that is circumposed about the stator.

As previously described, the rotor is of a generally specific construction with slight variations in the arrangement of the magnets provided therein. On the other hand, the stator may be of salient tooth or non-salient tooth construction or it may consist of a toroidal element with tapped windings. In addition, the stator may be wound so as to provide for double the number of indicating positions as phases, as previously described, or it may provide a single phase for each indicating position.

In any event, the greatest degree of accuracy will be achieved if the arc of the pole shoe is at least equal to the arc of the phase.

By way of further illustration, as best seen in FIGURE 10, the read-out device 20b may be of substantially the same construction as the device of FIGURE 2, wherein like parts have like numerals. The read-out device 20b will include a stator assembly 27b which may likewise include a generally cylindrical fixed core 31b. The stator assembly 27b and its teeth may, as in FIGURE 3, be formed of a plurality of laminations of magnetically soft material. The stator assembly 27b may, however, further include a sleeve 101 of magnetically soft material encircling its laminations and extending longitudinally coexistensive therewith, producing thereby a stator of non-salient tooth construction which will nevertheless be otherwise operable in like manner as the embodiment of FIGURES 1-3, except that less power is required since the field becomes substantially sinusoidal. This provides an optimum design for continuous excitation (continuous power). The drum will not necessarily hold position when power is "off."

FIGURE 11 is illustrative of a slightly modified embodiment providing for a like number of coils and phases and the same number of indicating or rotor positions. More specifically, the stator assembly 27c is provided with a plurality of angularly spaced, radially outstanding teeth 36c-47c and the stator and its teeth may be formed of a plurality of laminations of magnetically soft material. Electrical conductors or wires are wound about the teeth 36c-47c to form a plurality of coils 48c. As appears diagrammatically in FIGURE 11, each coil 48c extends about a respective tooth, each of the teeth 36c-47c having a single coil extending thereabout. Each coil 48c will be connected to define a single electrical phase. Thus, there are an equal number of phases and coils in the illustrated embodiment.

The angular distance or arc encompassed by each phase, in the illustrated embodiment of FIGURE 11, will equal to the angle subtended by one tooth. For example, the pole arc of the phase formed about tooth 41c will extend from the centerline of the space between teeth 41c and 42c to the centerline of the space between teeth 40c and 41c. It will now be appreciated that the magnetic field of the pole arc of the phase about tooth 41c is centered on the tooth 41c.

In like manner to the embodiment of FIGURES 1-3, a drumlike rotor 80c is circumposed about the teeth 36c-47c and windings 48c. The rotor 80c may include a cylinder or drum 81 coaxially circumposed about the stator 27c and having magnetic members 90c and 91c (91c not being shown), at diametrically opposed locations, fixed therein. Each magnetic member 90c and 91c may extend longitudinally along the teeth and have an arcuate configuration conforming to that of the stator and its teeth. As appears in FIGURE 11, each magnetic member 90c and 91c may be of an arcuate distance approximating the pole arc or pitch of the stator, being approximately one tooth in the illustrated embodiment. The rotor may be otherwise corresponding in construction to the previous described embodiments, and will be operable in analogous fashion.

In FIGURE 12 there is shown another slightly modified embodiment illustrating a construction utilizing, as a stator, a toroidal element with tapped windings. More specifically, a read-out device may be constructed substantially the same as the device of FIGURE 2, wherein like parts have like numerals.

Referring now to FIGURE 12, the stator assembly 27d includes a toroidal element 110 which may have circumposed thereabout a series of tapped windings or bobbins thus to create a discrete number of magnetic saliencies. In the illustrated embodiment of FIGURE 12, there is shown a winding 111 extending and circumposed about the element 110. The winding 111 may be tapped at a desired number of points and connected to an outside source to define a desired number of electrical phases. Thus, there will obtain an equal number of phases and windings. As is known in the art, a desired number of bobbins may be substituted for the winding 111 and each of the bobbins may likewise be connected to define a like number of electrical phases.

The angular distance or arc encompassed by each phase, in the illustrated embodiment of FIGURE 12, will be the angle subtended by a bobbin or between the respective ends of a pair of taps in the winding 111. It will now be appreicated that the magnetic field of the pole arc of any phase will be centered between the taps of the winding 111 or of the bobbins.

In the like manner to the embodiment of FIGURES 1–3, a drum-like rotor 80d is circumposed about the toroidal element 110 and the winding 111. The rotor 80d may include a cylinder or drum 81d coaxially circumposed about the stator 27d and having magnetic members 90d and 91d, at diammetrically opposed locations, fixed therein. Each magnetic member 90d and 91d may extend longitudinally along the depth of the element 110 and the winding 111 and have an arcuate configuration conforming to that of the element 110 and the windings 111. As appears in FIGURE 12, each magnetic member 90d and 91d may be of an arcuate distance approximating the pole arc of the stator, being approximately the distance between a pair of taps in the winding 111 in the illustrated embodiment. The rotor may be otherwise corresponding in construction to the previously described embodiments, and will be operable in analogous fashion.

It is to be noted that when two or more of the devices of this invention are mounted in close proximity to each other or when one device is mounted in close proximity to any device or material susceptible to magnetism there may be an interaction due to flux leakage. This affect may be overcome by adding a second or over-cylinder 181 of a suitably magnetically soft material such as is shown in phantom in FIGURE 6. Of course, any legend would then be on the outside of such over-cylinder.

From the foregoing, it is seen that the present invention provides a read-out device which fully accomplishes its intended objects and is well adapted to meet practical conditions of manufacture, installation and use.

Although the present invention has been described in some detail by way of illustration and example for purposes of clarity of understanding, it is understood that certain changes and modifications may be made within the spirit of the invention and scope of the appended claims.

What is claimed is:
1. A read-out device comprising,
a generally cylindrical central stator having an annular array of teeth outstanding from said stator and extending longitudinally therealong,
a plurality of selectively electrically energizable coils each circumposed about at least two adjacent teeth with adjacent coils extending about at least one common tooth whereby selectable energization of the coils about one of the common teeth will produce a salient pole at a particular angular determinable position,
a cylindrical freely rotatable hollow rotor circumposed about said stator teeth and coils and having a pair of oppositely positioned arcuate magnetic members carried by said rotor for angular positioning to said particular angular determinable position of said salient pole.

2. A read-out device according to claim 1, each successive pair of adjacent coils being connected together as a single phase defining a relatively large pole arc of centrally enhanced contour for maximum magnetic efficiency.

3. A read-out device according to claim 2, said coils each being circumposed about at least three adjacent teeth, and adjacent coils of said phase extending about at least two common teeth, whereby excitation of said phase defines a salient pole magnetically enhanced centrally medially of the common teeth and excitation of adjacent phases defines a salient pole magnetically enhanced centrally medially of the common teeth and excitation of adjacent phases defines a salient pole magnetically enhanced centrally medially between the salient poles of the separate phases, to provide an increased number of salient poles.

4. A read-out device comprising,
a stationary member having a plurality of angularly spaced energizable electromagnets which are adapted upon energization individually or in groups of two or more to produce a salient pole at one of a plurality of angular determinable positions,
a freely rotable rotor comprised of an annular non-magnetic member carrying interiorly thereof a pair of oppositely positioned arcuate magnetic pole members which are circumposed about said electromagnets for angular positioning to one of said determinable positions, each of said magnetic pole members having an arcuate extent substantially equal to said salient pole, and
a permanent magnet interposed within said non-magnetic member and extending diametrically between said arcuate magnetic pole members whereby said permanent magnet, said magnetic pole members, and said stationary member form a closed magnetic path.

5. A read-out device according to claim 4, said stationary member being a toroidal element having a plurality of tapped windings circumposed thereabout, each of said tapped windings being electrically connected to define a single electrical phase.

6. A read-out device according to claim 4, said stationary member being a toroidal element having a plurality of bobbin windings circumposed thereabout, said bobbins being equally angularly spaced about said toroidal element, each of said bobbins being electrically connected to define a single electrical phase.

7. A read-out device as defined in any one of claims 2, 3, 5 or 6 wherein each of said magnetic members is substantially coextensive with said phase for high magnetic efficiency.

8. A read-out device as defined in claims 1, 2, 3, 4, 5 or 6, further including an angular offset magnetic circuit formation for initiating 180-degree rotor rotation from any one of said determinable positions.

9. A read-out device as defined in claims 2, 3, 5 or 6, further including an angular magnetic formation comprised of an auxiliary coil electrically connected in said phase for initiating 180-degree rotor rotation from any one of said determinable positions.

10. A read-out device as defined in claims 2, 3, 4, 5 or 6, further including an angular magnetic formation comprised of an asymmetrical magnetic flux pattern on said magnetic members for initiating 180-degree rotor rotation from any one of said determinable positions.

References Cited

UNITED STATES PATENTS

| | | | |
|---|---|---|---|
| 1,950,754 | 3/1934 | Scofield | 310—152 |
| 2,943,313 | 6/1960 | Gordon et al. | 310—49 |
| 3,083,310 | 3/1963 | Tweedy et al. | 310—154 |
| 3,089,131 | 5/1963 | Morgan | 335—268 |
| 3,118,138 | 1/1964 | Milas et al. | 310—49 |
| 3,363,159 | 1/1968 | Bollhoefer | 335—268 |

BERNARD A. GILHEANY, Primary Examiner

D. M. MORGAN, Assistant Examiner

U.S. Cl. X.R.

310—49; 335—272; 340—378